US008527766B2

(12) United States Patent
Chase et al.

(10) Patent No.: US 8,527,766 B2
(45) Date of Patent: Sep. 3, 2013

(54) REDUCING LEAKAGE OF INFORMATION FROM CRYPTOGRAPHIC SYSTEMS

(75) Inventors: Melissa E. Chase, Seattle, WA (US); Adam M. O'Neill, Atlanta, GA (US)

(73) Assignee: Microsoft Corporation, Redmond, WA (US)

( * ) Notice: Subject to any disclaimer, the term of this patent is extended or adjusted under 35 U.S.C. 154(b) by 741 days.

(21) Appl. No.: 12/649,342

(22) Filed: Dec. 30, 2009

(65) Prior Publication Data
US 2011/0161670 A1    Jun. 30, 2011

(51) Int. Cl.
    *H04L 9/30*    (2006.01)
(52) U.S. Cl.
    USPC ........... 713/170; 713/171; 380/44; 380/45
(58) Field of Classification Search
    USPC ............... 713/170–171; 380/44–45
    See application file for complete search history.

(56) References Cited

U.S. PATENT DOCUMENTS

| | | | | |
|---|---|---|---|---|
| 5,640,454 | A * | 6/1997 | Lipner et al. | 380/286 |
| 6,049,613 | A * | 4/2000 | Jakobsson | 380/47 |
| 6,389,136 | B1 * | 5/2002 | Young et al. | 380/28 |
| 6,724,894 | B1 | 4/2004 | Singer | |
| 6,901,512 | B2 * | 5/2005 | Kurn et al. | 713/164 |
| 6,934,392 | B1 * | 8/2005 | Vanstone | 380/278 |
| 7,565,527 | B2 * | 7/2009 | Sandhu et al. | 713/155 |
| 7,634,091 | B2 * | 12/2009 | Zhou et al. | 380/277 |
| 8,291,229 | B2 * | 10/2012 | Vuillaume et al. | 713/176 |
| 2003/0133567 | A1 | 7/2003 | Yajima et al. | |
| 2003/0229598 | A1 | 12/2003 | de Jong | |
| 2006/0045264 | A1 | 3/2006 | Kocher et al. | |
| 2009/0113217 | A1 | 4/2009 | Dolgunov et al. | |

FOREIGN PATENT DOCUMENTS

WO    2008044113 A2    4/2008

OTHER PUBLICATIONS

Oswald, et al, "A Side-Channel Analysis Resistant Description of the AES S-Box," Fast software encryption: 12th International Workshop, FSE 2005, Lecture Notes in Computer Science, vol. 3557, 2005, Springer Berlin, Heidelberg, retrieved at <<http://www.iacr.org/archive/fse2005/35570401/35570401.pdf>>, pp. 413-423.

Ors, et al., "Side-Channel Resistant Cryptographic System Design and Implementation," Istanbul Technical University, Istanbul, Turkey, 2006, retrieved at <<http://www2.itu.edu.tr/~orssi/projeler/SCA.html>>, 3 pages.

Naor, et al., "Public-Key Cryptosystems Resilient to Key Leakage," Advances in Cryptology, CRYPTO 2009, Lecture Notes in Computer Science, vol. 5677, Aug. 2009, Springer Berlin, Heidelberg, retrieved at <<http://eprint.iacr.org/2009/105.pdf>>, 40 pages.

(Continued)

*Primary Examiner* — Yin-Chen Shaw

(57) ABSTRACT

A system is described for reducing leakage of meaningful information from cryptographic operations. The system uses a pairwise independent hash function to generate a modified secret key SK' having individual components. The system forms a modified secret key collection that includes SK' and its individual components. The system then uses the modified secret key collection to decrypt a message. The decryption involves providing multiple partial operation results in separate respective steps. Leakage of meaningful information is reduced due to difficulty in piecing together meaningful information from information leaked by the separate partial operations. In one example, the hash function has the form $H_K(r)=ar+b$, where a, b, and r are selected values, such as random numbers. In another example, the hash function has the form $H_K(r)=A^r *B$, where A, B, and r are selected values.

20 Claims, 7 Drawing Sheets

(56) References Cited

OTHER PUBLICATIONS

"Chair for Embedded Security, Side Channel Cryptanalysis Lounge," ECRYPT—Network of Excellence in Cryptology, Kerstin Lemke-Rust, Ruhr-Universität Bochum, Germany, retrieved at <<http://www.crypto.ruhr-uni-bochum.de/en_sclounge.html>>, accessed on Dec. 2, 2009, 24 pages.

Pietrzak, Krzysztof, "Leakage-Resilient Public-Key Cryptography," Eurocrypt 2009 Rump Session, Eurocrypt 2009, Cologne, Germany, Apr. 2009, retrieved at <<http://eurocrypt2009rump.cr.yp.to/6b07e1b8d29462503c8f15ccdd0bac2a.pdf>>, 24 pages.

"2009 Workshop on Cryptographic Protocols and Public-Key Cryptography", program description, retrieved at <<http://wpk.dia.unisa.it/program/index.shtml>>, retrieved on Dec. 29, 2009, 3 pages.

Micali, et al., "Physically Observable Cryptography," in Theory of Cryptography, Lecture Notes in Computer Science, vol. 2951, Springer Berlin, Heidelberg, retrieved at <<http://www.cs.bu.edu/~reyzin/papers/physec.pdf>>, Nov. 29, 2003, 23 pages.

Dziembowski, et al., "Leakage-Resilient Cryptography," 49th Annual IEEE Symposium on Foundations of Computer Science, Oct. 2008, retrieved at <<http://homepages.cwi.nl/~pietrzak/publications/DP08.pdf>>, 11 pages.

Canetti, Ran, "Towards Realizing Random Oracles: Hash Functions That Hide All Partial Information," Mar. 2000, retrieved at <<http://www.research.ibm.com/security/pof-long.ps>>, 19 pages.

Dodis, et al., "Correcting Errors Without Leaking Partial Information," Proceedings of the Thirty-Seventh Annual ACM Symposium on Theory of Computing, 2005, retrieved at <<http://people.csail.mit.edu/asmith/PS/proxobf-stoc-proc.pdf>>, 10 pages.

\* cited by examiner

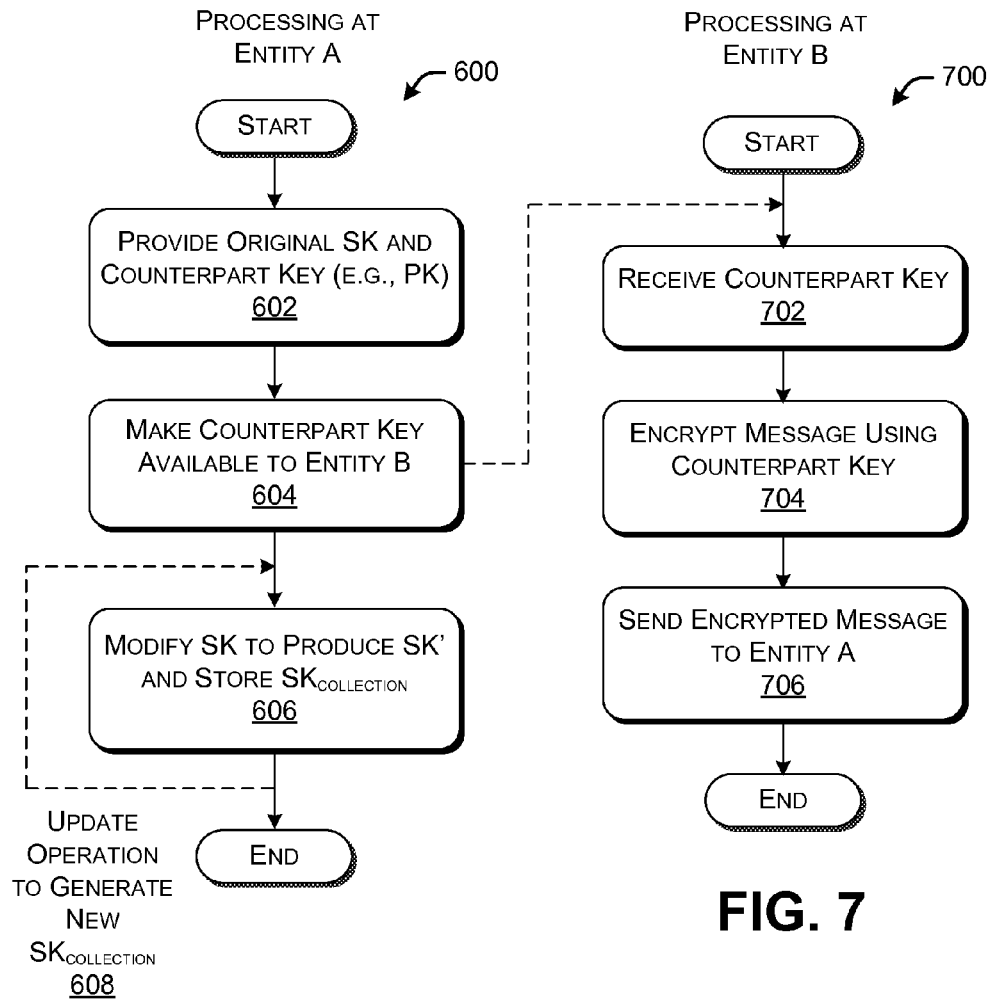

REDUCING LEAKAGE OF INFORMATION FROM CRYPTOGRAPHIC SYSTEMS

BACKGROUND

An adversary may attempt to extract meaningful information from a cryptographic system using various approaches. In one approach, the adversary may attempt to uncover theoretical vulnerabilities in the cryptographic system. In another approach, the adversary may attempt to exploit weaknesses in the administrative or technical environment associated with the cryptographic system. Generally, these types of attacks often make a direct attempt to obtain secret information, e.g., through mathematical analysis, system "hacking," or simple guile.

A side-channel attack, by contrast, attempts to extract secret information in indirect fashion by observing the physical characteristics of the cryptographic system in the course of its operation. That is, the cryptographic system is composed of one or more electrical computers. In the course of operation, the cryptographic system exhibits physical behavior. An adversary may capture this behavior and then attempt to correlate this behavior with secret information. For example, the adversary may measure the physical characteristics of a computer over a span of time as it decrypts messages using a secret key. The adversary may hope to assemble enough information over this span of time to enable it to reconstruct the secret key.

An adversary may exploit various physical characteristics of a cryptographic system. For example, the adversary may capture: a) the length of time the system takes to perform operations; b) the amount of power consumed by the system in performing its operations; c) the electromagnetic radiation (or even noise) emitted by the system in the course of performing its operations, and so on. In any case, the cryptographic system may be said to "leak" information which can be potentially exploited by an adversary. An adversary which attempts to exploit leaked information is said herein to mount a leakage-type attack.

The industry has attempted to thwart these types of attacks in various ways, e.g., by proposing both physical and algorithmic safeguards that attempt to reduce the leakage of meaningful information. Yet there remains room for considerable improvement in this field.

SUMMARY

A system is described herein for reducing leakage of meaningful information from cryptographic operations by generating a modified secret key SK' using a pairwise independent hash function, where the modified secret key SK' includes individual components. The system stores a modified secret key collection ($SK_{collection}$) that includes the modified secret key SK' and its individual components. The system later decrypts a message using the modified secret key collection in multiple stages, each stage relying on one or more components of the modified secret key collection. That is, the system performs plural partial operations to generate plural respective partial operation results. The message is decrypted by combining the partial operation results in various scheme-specific ways. The system reduces the leakage of meaningful information due to the difficulty in piecing together meaningful information from separate pieces of leakage information that originate from the respective plural partial operations.

In one implementation, the pairwise independent hash function is given by $H_K(r)=ar+b$, where a, r, and b are selected values, such as random numbers. The modified secret key SK' is given by $SK'=SK+H_K(r)$, where SK is an original (non-modified) secret key generated by the system. The modified secret key collection in this example includes SK', a, r, and b.

In another implementation, the pairwise independent hash function is given by $H_K(r)=A'^*B$, where A, r, and B are selected values. The modified secret key SK' is given by $SK'=SK*H_K(r)$. The modified secret key collection in this example includes SK', A, r, and B.

According to another illustrative aspect, the system can periodically (or on any other basis) generate an updated modified secret key collection.

The above approach can be manifested in various types of systems, components, methods, computer readable media, data structures, articles of manufacture, and so on.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIG. 6 is a flowchart that describes an illustrative procedure, performed by an entity A, for generating a modified secret key SK' and modified secret key collection using the system of FIG. 1.

FIG. 7 is a flowchart that describes an illustrative procedure, performed by an entity B, for generating an encrypted message using a counterpart key (such as a public key PK) provided by the entity A or some other agent.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure sets forth a system for reducing leakage-type attacks by generating and using a modified secret key collection. This disclosure is organized as follows. Section A describes an illustrative system for reducing leakage-type attacks. Section B describes illustrative methods which explain the operation of the system of Section A. And Section C describes illustrative processing functionality that can be used to implement any aspect of the features described in Sections A and B.

Figure 9:
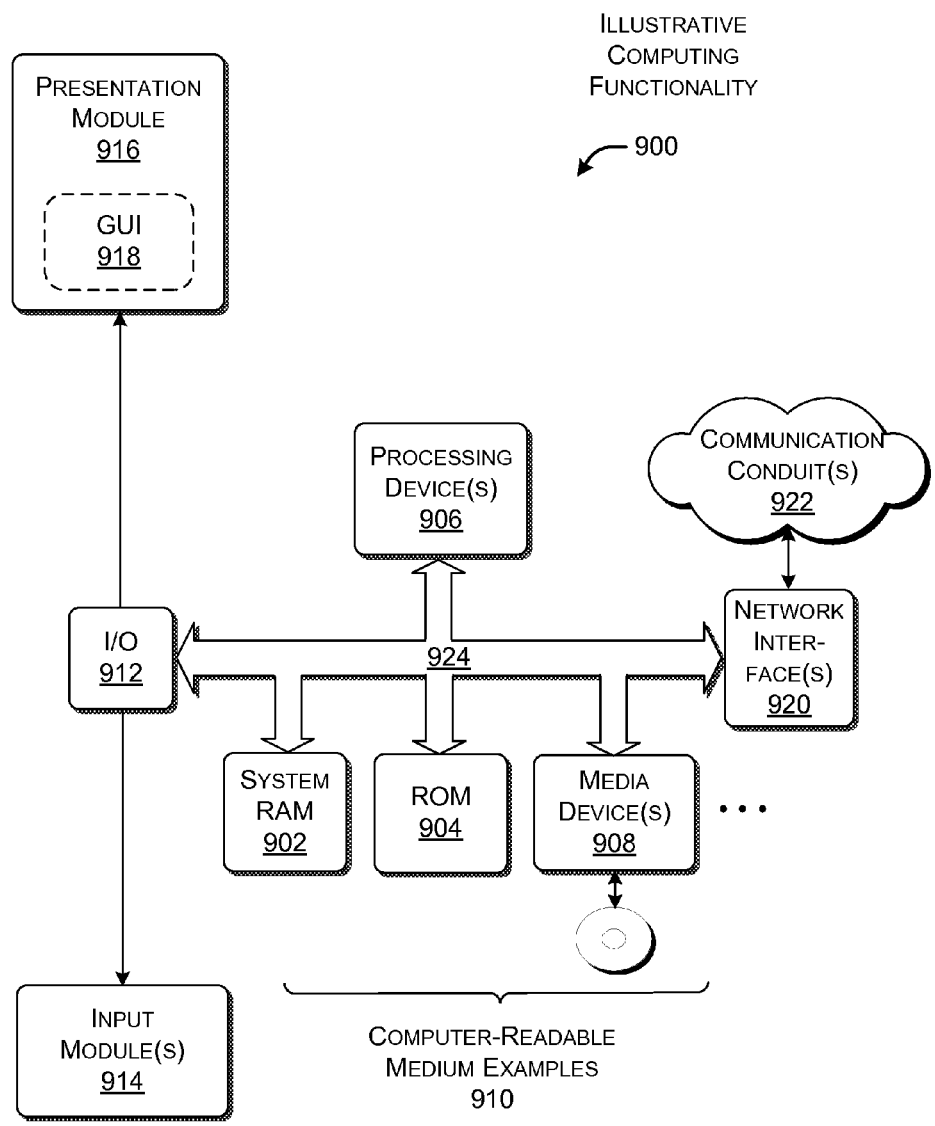
FIG. 9 shows illustrative processing functionality that can be used to implement any aspect of the features shown in the foregoing drawings.

As a preliminary matter, some of the figures describe concepts in the context of one or more structural components, variously referred to as functionality, modules, features, elements, etc. The various components shown in the figures can be implemented in any manner. In one case, the illustrated separation of various components in the figures into distinct units may reflect the use of corresponding distinct components in an actual implementation. Alternatively, or in addition, any single component illustrated in the figures may be implemented by plural actual components. Alternatively, or in addition, the depiction of any two or more separate components in the figures may reflect different functions performed by a single actual component. FIG. 9, to be discussed in turn, provides additional details regarding one illustrative implementation of the functions shown in the figures.

Other figures describe the concepts in flowchart form. In this form, certain operations are described as constituting distinct blocks performed in a certain order. Such implementations are illustrative and non-limiting. Certain blocks described herein can be grouped together and performed in a single operation, certain blocks can be broken apart into plural component blocks, and certain blocks can be performed in an order that differs from that which is illustrated herein (including a parallel manner of performing the blocks). The blocks shown in the flowcharts can be implemented in any manner.

As to terminology, the phrase "configured to" encompasses any way that any kind of functionality can be constructed to perform an identified operation. The term "logic component" or "logic" encompasses any functionality for performing a task. For instance, each operation illustrated in the flowcharts corresponds to a logic component for performing that operation. When implemented by a computing system, a logic component represents an electrical component that is a physical part of the computing system, however implemented. Finally, the terms "exemplary" or "illustrative" refer to one implementation among potentially many implementations.

A. Illustrative Systems

Figure 1:
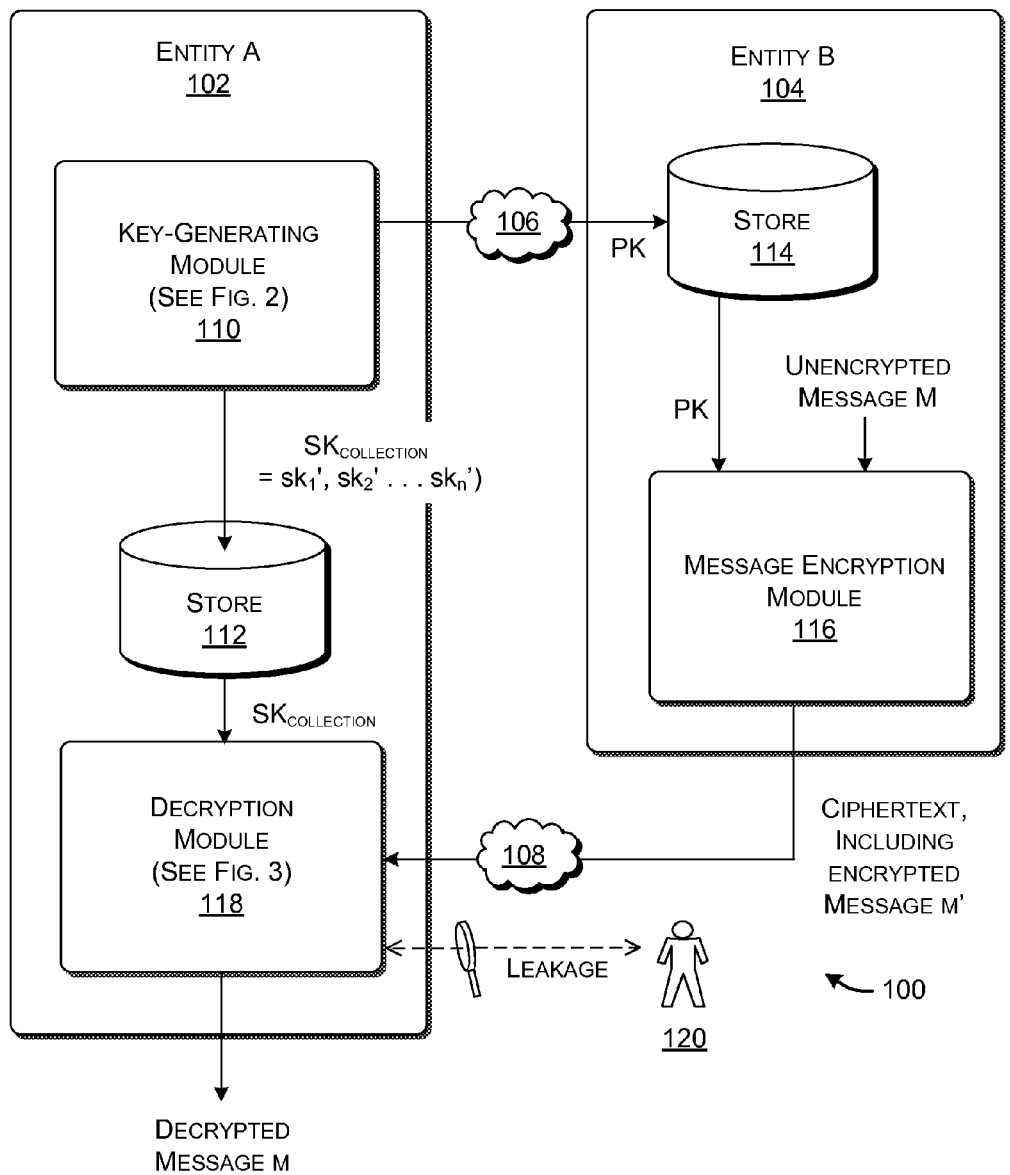
FIG. 1 shows an illustrative system for encrypting and decrypting messages, including provisions to reduce leakage-type attacks.

FIG. 1 shows an illustrative system 100 for encrypting and decrypting messages, including provisions to reduce leakage-type attacks. Leakage-type attacks refer to attempts to reconstruct secret information based on any type of physical behavior exhibited by a cryptographic system in the course of its operation.

The system 100 may include at least a first entity A 102 and a second entity B 104. Each of these entities (102, 104) can correspond to computing functionality of any type, such as a desktop computing device, a laptop computing device, a personal digital assistant (PDA) type computing device, a stylus-type computing device, a mobile phone type computing device, a game console device, a set-top box device, a server-type computing device, an application-specific computing device, a component module of any type within a larger system, and so on. The networks (106, 108) can correspond to any type of local area network, wide area network (such as the Internet), or some combination therefore. The networks (106, 108) can be implemented by any combination of hardwired links, wireless links, router devices, name server devices, gateways, etc., as governed by any protocol or combination of protocols. Network 106 can represent the same network as network 108, or a different network. Alternatively, entity A 102 and entity B 104 may correspond to any two components within any type of system, connected in any manner.

The system 100 can use any symmetric or asymmetric encryption scheme, or a combination of symmetric or asymmetric encryption schemes. A symmetric encryption scheme refers to an algorithm that uses the same key to perform both encryption and decryption (or it uses two keys that are related in a trivial manner). An asymmetric encryption scheme refers to an algorithm that uses different keys for encryption and decryption. However, to provide a concrete (yet representative) example, Section A will emphasize the use of an asymmetric public key encryption scheme.

By way of overview, in one illustrative asymmetric encryption context, the entity A 102 generates a public key which it sends to the entity B 104. The entity B 104 uses the public key to encrypt a message, which it then sends to the entity A. The entity A 102 uses a modified secret key collection ($SK_{collection}$) to decrypt the message sent by the entity B 104, where $SK_{collection}$ includes a modified secret key SK' and individual components of the modified secret key SK'. Each of these aspects of the system 100 will be described in turn below. However, it is pointed out that this system 100 (and associated manner of operation) is just one type of environment that can make use of the leakage-resilient features of the system 100 (to be discussed below). As stated, for instance, the system 100 can use a symmetric scheme. Here, entity A 102 and entity B 104 possess the same secret key (or keys that are related in a trivial manner).

To begin with, the entity A 102 includes a key-generating module 110 for generating an original secret key SK and a corresponding public key PK using any available public-key cryptography technique. One of many available techniques is the well known El Gamal encryption technique. The entity A 102 can make the public key PK available to the entity B 104 through various standard mechanisms. For instance, the entity A 102 can directly transfer the public key PK to the entity B 104 via the network 106. Or the entity A 102 can post its public key PK to a storage site which is accessible to the entity B 104, and so on.

The key-generating module 110 then modifies the original secret key SK to produce a modified secret key, denoted by SK' herein. In one approach, the key-generating module 110 modifies the original secret key SK using a pairwise independent hash function $H_K(r)$, where $H_K$ refers to some hash function that is keyed by the key K, and which accepts some input r. Generally, if $H_K$ is pairwise independent, that means that, for any two values (r, r'), if K is chosen at random, then the resulting pair ($H_K(r)$, $H_K(0)$) is also random. (Note that various components of the system 100 are said to generate random information. This means that these components produce information that has the appearance of being random, although it may or may not be actually random in a rigorous sense).

In one implementation, the pairwise independent hash function is given by $H_K(r)=ar+b$, where a, b, and r are selected values described below (and where "K" means that the hash function is keyed by the values a and b). The modified secret key SK' is given by SK'=SK+$H_K(r)$, where SK is the original (non-modified) secret key generated by the system 100. The key-generating module 110 can update one or more of the selected values (e.g., r, a, and b) on a periodic basis or any other basis.

In another implementation, the pairwise independent hash function is given by $H_K(r)=A'^*B$, where A, B, and r, are selected values described below. The modified secret key SK' is given by SK'=SK*$H_K(r)$. Again, the key-generating module 110 can update one or more of the selected values (e.g., r, A, and B) on a periodic basis or any other basis.

The selected values (e.g., r, a, b, A, B, etc.) can be produced in any appropriate manner. In one case, one or more of these values can be produced by a random number generating algorithm (which, as said, may constitute an algorithm that produces pseudo-random information, etc.). Alternatively, or in addition, one or more of the values can correspond to points along an elliptic curve. More generally, these values can be selected from any group associated with a mathematical problem that is considered to be computationally intractable.

The above examples are representative, rather than exhaustive; still further implementations are possible which use different respective pairwise independent hash functions. In general, the modified secret key SK' that is produced has plural individual components. For example, in the first example cited above, the key-generating module 110 produces the individual components a, b, r. In the second example cited above, the key-generating module 110 produces the individual components, A, B, r.

The key-generating module 110 forms a modified secret key collection ($SK_{collection}$) that includes the modified secret key SK' and its individual components. For example, in the first example, the $SK_{collection}$ can include the members: SK' (which equals SK+ar+b), a, b, and r. In the second example, the $SK_{collection}$ can include the members: SK' (which equals $SK*A^r*B$), A, B, and r. More generally, $SK_{collection}$ includes members denoted in FIG. 1 as $sk_1'$, $sk_2'$, $sk_n'$.

The key-generating module 110 can store the members of the modified secret key collection, one at a time as they are generated, in a store 112 of any type. The entity A 102 can store and maintain the members of the secret key collection such that there is no joint leakage between the members. Further, the key-generating module 110 can optionally delete the original secret key SK at an appropriate juncture, e.g., to reduce the risk that this information will be uncovered by an adversary. The entity B 104 includes a store 114 of any type for storing the public key provided by the entity A 102. Alternatively, the entity B 104 may not store the public key; rather, the entity B 104 may obtain the public key before each encryption that it performs.

The entity B includes a message encryption module 116 for using the public key PK to encrypt a message (M), to produce an encrypted message M'. For example, to provide a concrete (yet illustrative) frame of explanation, consider the El Gamal encryption algorithm. In El Gamal encryption, the public key corresponds to $g^x$ (where g is a generator of a cyclic group G within $Z_p$). (The public key is more precisely $PK=g^x$ mod p; however, the "mod p" aspect of El Gamal encryption is omitted to facilitate discussion below.) The message encryption module 116 selects a random number y from $\{0, \ldots q-1\}$. The message encryption module 116 then forms an encryption key $g^{xy}$ based on the public key PK, and then encrypts the message M using this key to produce an encrypted message M'. The message encryption module 116 sends ciphertext information comprising and M' to the entity A 102. To emphasize, the El Gamal algorithm refers to one among many possible public encryption schemes. The leakage-resilient functions described herein can be applied to other types of encryption schemes.

A decryption module 118 receives the ciphertext information from the entity B 104. Based on the ciphertext information, in combination with the modified secret key collection, the decryption module 118 decrypts the encrypted message M' to produce the original message M. The manner in which the decryption module 118 can perform this task is described in detail below. By way of overview, the decryption module 118 decrypts the message in piecemeal fashion using plural partial operations, rather than an integrated single operation. Each of these plural partial operations produces a partial operation result. A final partial operation yields a final decryption result based on results provided by temporally prior partial operations.

Each of the partial operations may leak some information about the computation that is being performed by the partial operation. An adversary 120 of any nature can conceivably collect the information leaked by these partial operations over a span of time. However, the adversary 120 cannot feasibly reconstruct meaningful secret information, such as the secret key SK, on the basis of the separate pieces of information from the partial operations. Hence, the system 100 as a whole achieves the intended goal of reducing the risk of leakage-type attacks.

Figure 2:
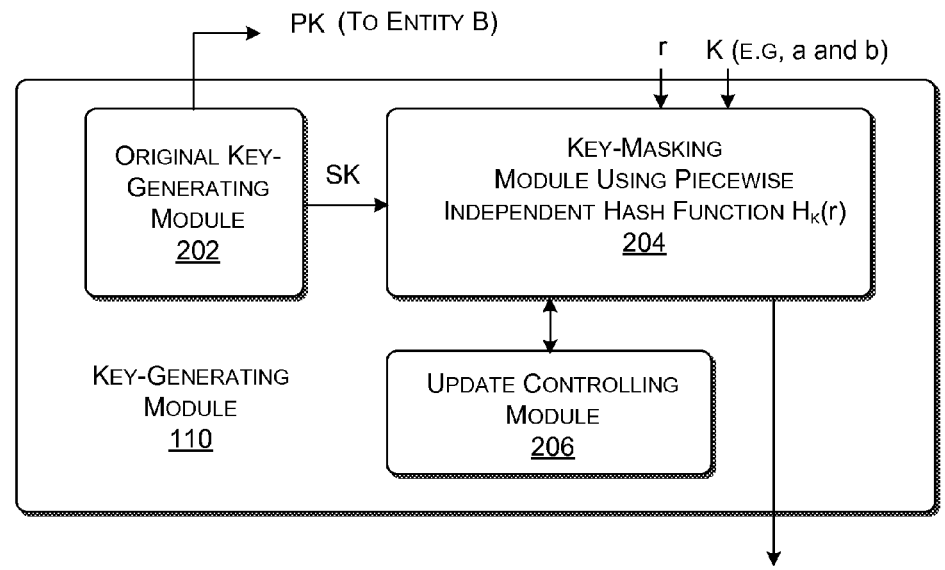
FIG. 2 shows an illustrative key-generating module for use in the system of FIG. 1.

FIG. 2 shows additional details of the illustrative key-generating module 110. The key-generating module 110 includes an original key-generating module 202 for generating an original secret key SK and a corresponding public key PK in the manner described above. The original key-generating module 202 makes the public key PK available to other entities, such as the entity B 104. In the case of a symmetric encryption algorithm, the key-generating module 202 can generate a single key for use by both entity A 102 and entity B 104 (or two keys that are related to each other in a trivial manner).

The key-generating module 110 also includes a key-masking module 204. The key-masking module 204 computes the modified secret key SK' based on the original secret key SK and one or more other inputs, such as the selected values r, a, and b, or the selected values r, A, and B, etc. The values a and b (or A and B) are generally represented as key information K in FIG. 2. The key-masking module 204 uses any type of pairwise independent hash function $H_K(r)$ to generate SK' in the illustrative manner described above. The key-masking module 204 forms the modified key collection ($SK_{collection}$) in the manner described above, e.g., by forming the collection SK', a, b, r in the first example, and the collection SK', A, B, r for the second example.

The key-generating module 110 also includes an update controlling module 206. The update controlling module 206 controls the key-masking module 204 so that it updates the modified secret key collection on a periodic basis or any other basis. This updating operation can involve updating r and/or any component of K, which produces a new SK'.

Figure 3:
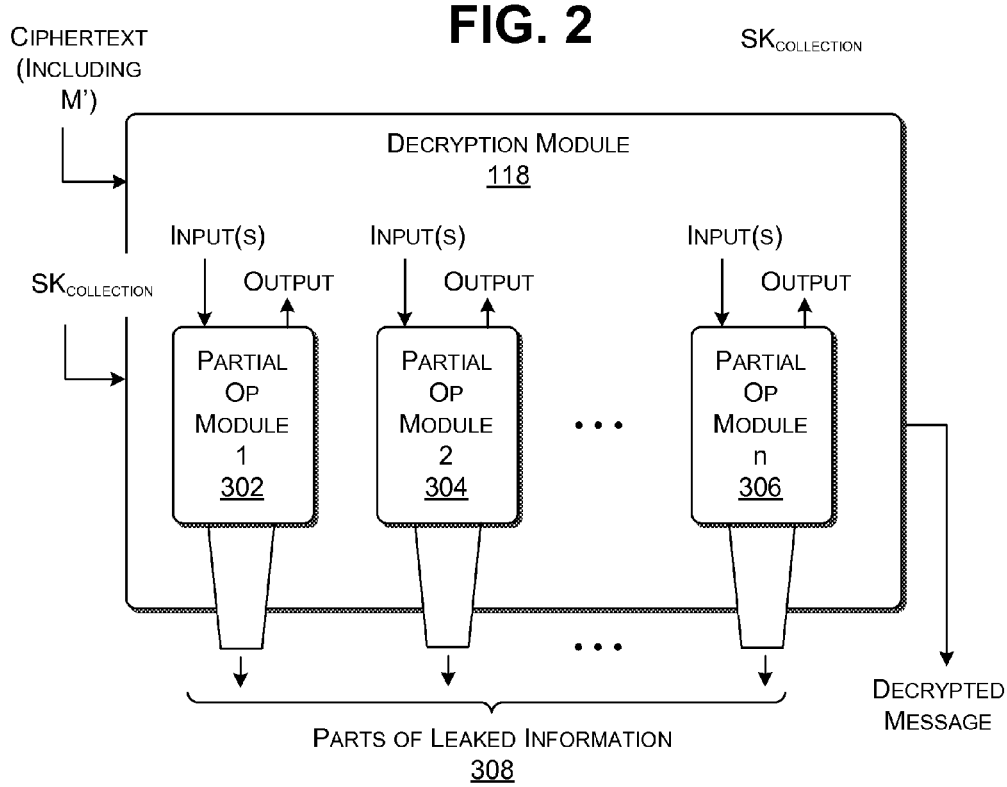
FIG. 3 shows an illustrative decryption module for use in the system of FIG. 1.

FIG. 3 shows additional details of the decryption module 118 of FIG. 1. The decryption module 118 receives an encrypted message M' from the entity B 104 (or from some other provider), along with possibly other ciphertext information (e.g., $g^y$, if El Gamal encryption is used). The decryption module 118 also retrieves, in piecemeal fashion, the locally-stored members of the modified secret key collection. The decryption module performs pairwise computation on this input data to decrypt the encrypted message. FIG. 3 illustrates the piecemeal nature of the processing performed by the decryption module 118 by showing plural partial operation modules (302, 304, . . . 306). Although three such modules are shown in FIG. 3, the decryption module 118 can include any plural number of such modules.

Each partial operation module receives one or more inputs. For example, one or more of the inputs may correspond to one or more members of the modified secret key collection that are retrieved from the store 112 in piecemeal fashion (rather than all together in one retrieval operation). Alternatively, or in addition, one or more of the inputs may correspond to one or more of the outputs of other partial operation modules. Alternatively, or in addition, one or more of the inputs may correspond to at least parts of the ciphertext information that is received from entity B 104. Each partial operation module further provides an output, which is also referred to as a partial operation result. The decryption module 118 can store each partial operation result to the store 112 after it is generated.

The decryption module 118 uses the partial operation results to reconstruct the key that is used to decrypt the encrypted message. The decryption module 118 performs this task by combining the partial operation modules (302, 304, . . . 306) and associated partial operation results in various scheme-specific ways (one of which will be explained below with reference to FIG. 4). A final partial operation module can provide the decrypted message.

To repeat, each of the partial operation modules (302, 304, . . . 306) can potentially exhibit physical behavior associated with the computations that it individually performs. In other words, each of the partial operation modules (302, 304, . . . 306) may potentially leak information associated with its physical operation. FIG. 3 illustrates this property by metaphorically showing a funnel-like feature which protrudes from each partial operation module. An adversary can potentially observe a set 308 of such separate pieces of leaked information. But it is not possible for the adversary to feasibly combine these separate pieces of information to extract meaningful data from the decryption module 118 (if, in fact, this operation is theoretically possible at all).

Figure 4:
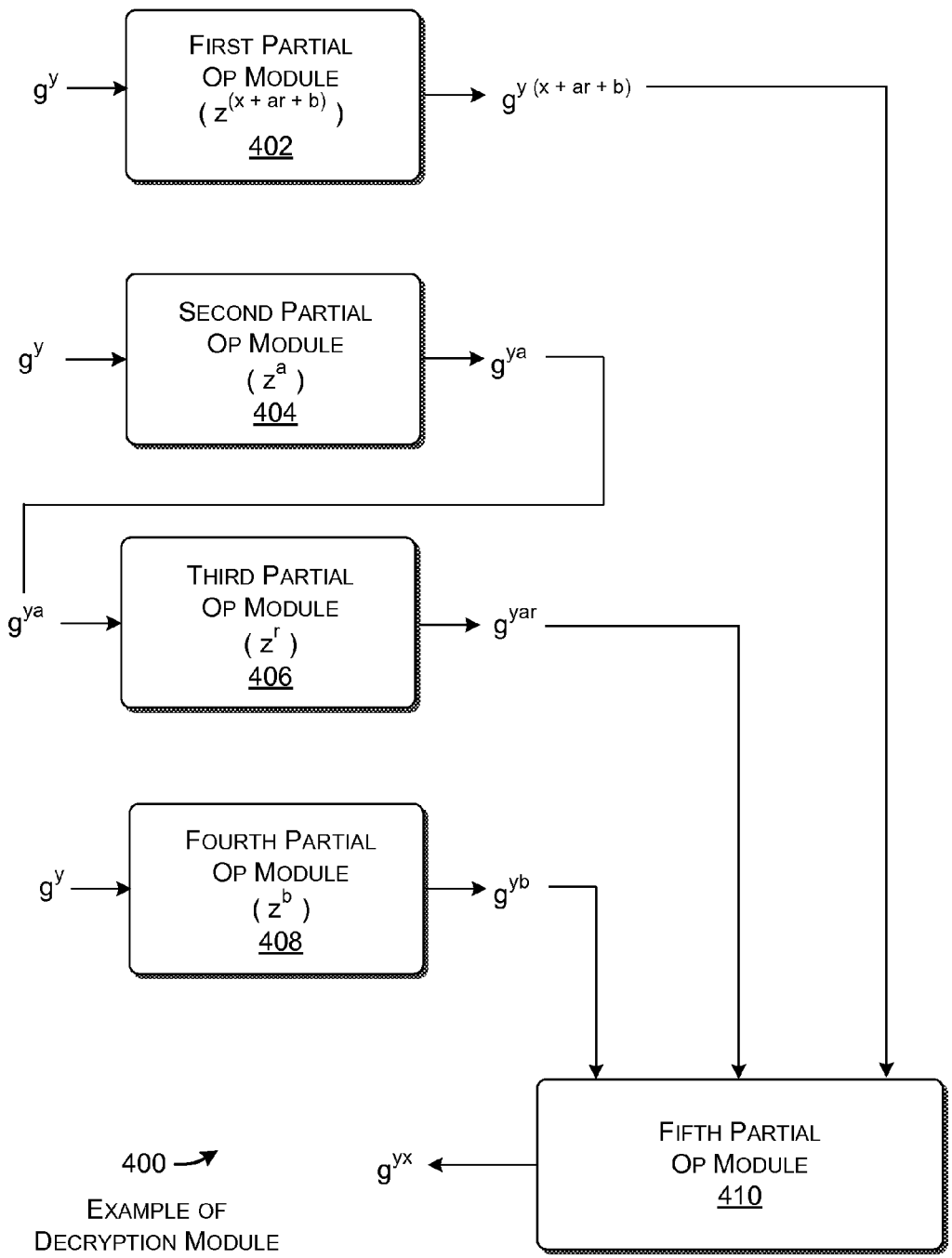
FIG. 4 shows one illustrative application of the decryption module of FIG. 3.

FIG. 4 shows one illustrative implementation 400 of the decryption module 118 of FIG. 3. This particular example corresponds to a modification of El Gamal encryption, introduced above. Further, FIG. 4 corresponds to a case in which the key-generation module 110 generates a modified secret key SK' defined by SK'=SK+$H_K$(r), wherein $H_K$(r)=ar+b, and where a, b, and r are selected values. The modified secret key collection in this example includes SK', a, b, and r.

The decryption module 118 of FIG. 4 includes five partial operation modules. A first partial operation module 402 receives the ciphertext information $g^y$ from the entity B 104. It operates on this input by performing an exponentiation based on SK' (which equals SK+ar+b), which has been previously stored as one member of the modified secret key collection. The first partial operation module 402 outputs the partial operation result $g^{y(SK+ar+b)}$.

A second partial operation module 404 again receives the ciphertext information $g^y$ from the entity B 104. It operates on this input by performing an exponentiation based on a, which has been previously stored as one member of the modified secret key collection. The second partial operation module 404 outputs the partial operation result $g^{ya}$.

A third partial operation module 406 receives the output of the second partial operation module 404, namely, ea. It operates on this input by performing an exponentiation based on r, which has been previously stored as one member of the modified secret key collection. The third partial operation module 406 outputs the partial operation result $g^{yar}$.

A fourth partial operation module 408 again receives the ciphertext information $g^y$ from the entity B 104. It operates on this input by performing an exponentiation based on b, which has been previously stored as one member of modified secret key collection. The fourth partial operation module 408 outputs the partial operation result $g^{yb}$.

A fifth partial operation module 410 receives inputs from the first partial operation module 402 (namely $g^{y(SK+ar+b)}$), the third partial operation module 406 (namely $g^{yar}$), and the fourth partial operation module 408 (namely $g^{yb}$). It operates on these inputs to reconstruct the partial operation result of $g^{yx}$. Since $g^{yx}$ was the key used by the message encryption module 116 to encrypt the message, the decryption module 118 is now able to decrypt the encrypted message. The fifth partial operation module 410 can perform the actual decryption operation, or another partial operation module (not shown) can perform this task.

An adversary cannot uncover secret keys or other meaningful data by piecing together the partial operation results generated by the separate modules shown in FIG. 4.

Figure 5:
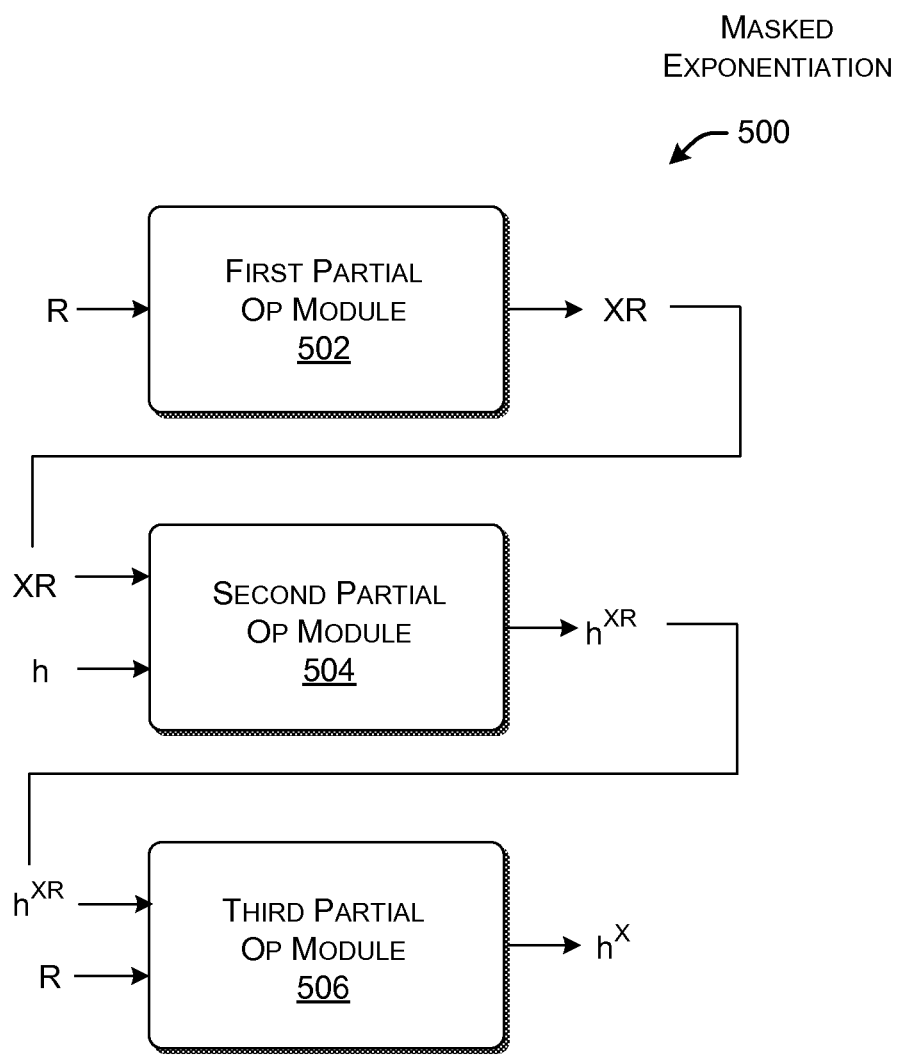
FIG. 5 shows another illustrative application of the decryption module of FIG. 3.

FIG. 5 indicates that some of the partial operation modules in the decryption module 118 can be used to perform exponentiation in a piecemeal manner to reduce the risk of a leakage-type attack. These partial operation modules provide a result that can be used, in turn, in a more encompassing decryption operation. For example, each exponentiation operation illustrated in FIG. 4 can rely on the piecemeal processing shown in FIG. 5.

More specifically, FIG. 5 shows three partial operation modules. A first partial operation module 502 receives a random value R or other selected value. It operates on this input by multiplying R by X, to produce a partial operation result of XR.

A second partial operation module 504 receives the value XR from the first partial operation module 502. The second partial operation module 504 also receives an input value h. In response, the second partial operation module 504 performs an exponentiation to provide a partial operation result of $h^{XR}$.

A third partial operation module 506 receives the value $h^{XR}$ produced by the second partial operation module 504. The third partial operation module 506 also receives the input value R. In response, the third partial operation module 506 outputs a partial operation result of $h^X$, e.g., by now removing the contribution of R.

In the process of computing $h^x$, the decryption module 118 only leaks some information about h and some information about x, but not any joint information about the two values taken together.

B. Illustrative Processes

Figure 8:
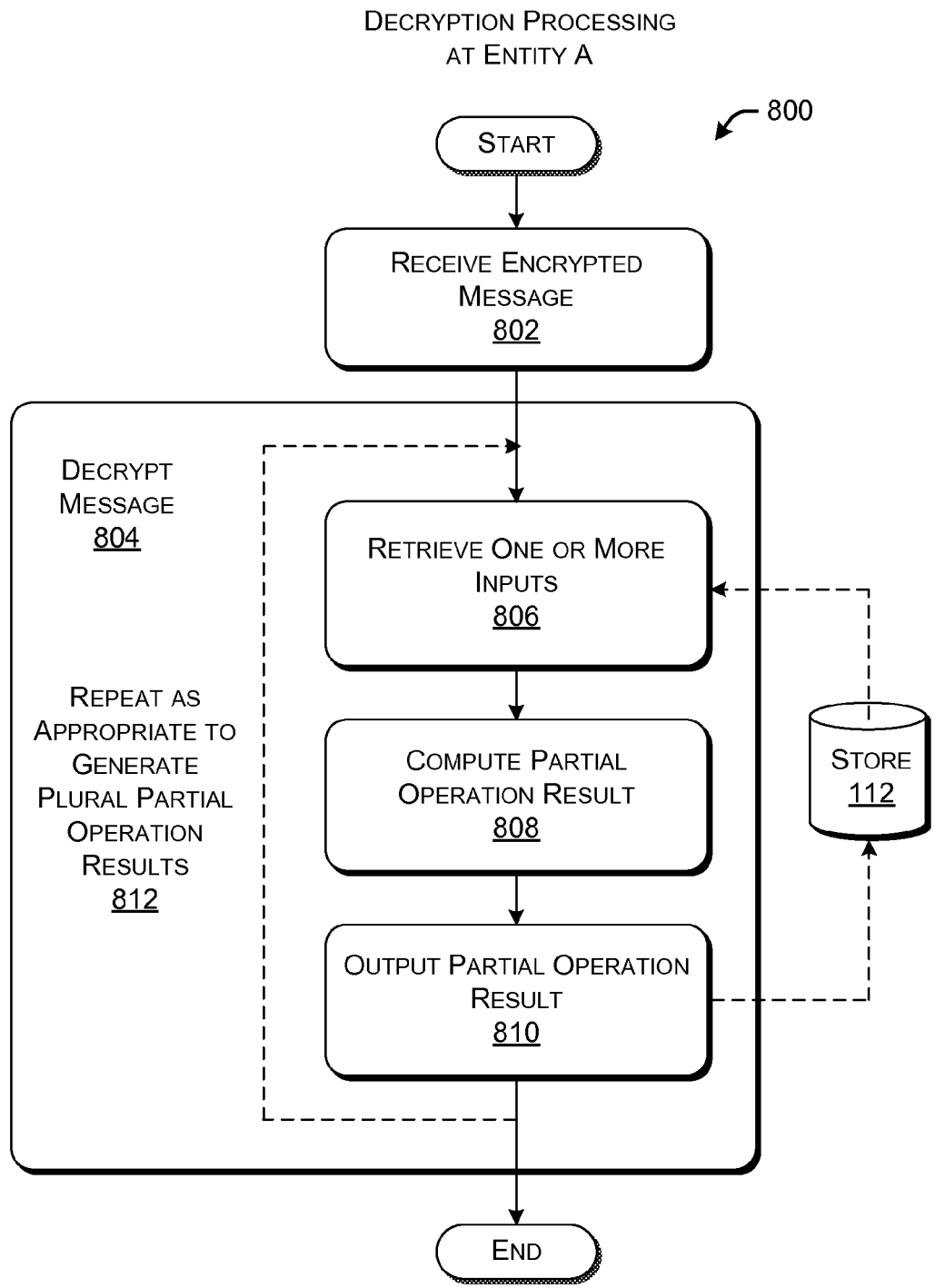
FIG. 8 is a flowchart that describes an illustrative procedure, performed by the entity A, for decrypting the message sent by the entity B.

FIGS. 6-8 show procedures (600, 700, 800) that explain one manner of operation of the system 100 of FIG. 1. Since the principles underlying the operation of the system 100 have already been described in Section A, certain operations will be addressed in summary fashion in this section.

Starting with FIG. 6, this figure describes a procedure 600, performed by the entity A 102, for generating a modified secret key SK' using the system of FIG. 1.

In block 602, the key-generating module 110 generates an original secret key SK and a corresponding counterpart key. In the case of an asymmetric encryption scheme (corresponding to the main example of Section A), the counterpart key is a public key PK. In the case of a symmetric encryption scheme, the counterpart key is the same as the secret key or another key that is trivially related to the secret key.

In block 604, the key-generating module 110 or some other agent makes the counterpart key available to the entity B 104.

In block 606, the key-generating module 110 modifies the original secret key SK using a pairwise independent hash function $H_K$(r) to produce a modified secret key SK'. The modified secret key SK's has multiple individual components. The key-generating module 110 can form a modified key collection ($SK_{collection}$) that includes SK' and its individual components. The key-generating module 110 can serially store the members of $SK_{collection}$ in the store 112 upon their respective computation. The entity A 102 can store and maintain the members of the secret key collection such that there is no joint leakage between the members.

In block 608, the key-generating module 110 updates the modified secret key collection on a periodic basis or any other basis.

Although not illustrated in FIG. 6, the key-generating module 110 can optionally delete the original secret key SK from the store 112 at an appropriate juncture in its processing. This reduces the risk that the original secret key is uncovered.

FIG. 7 describes a procedure 700, performed by the entity B 104, for generating an encrypted message using the counterpart key (e.g., a public key PK) provided by the entity A 102 or some other agent.

In block 702, the entity B 104 receives the counterpart key from the entity A 102 or some other agent.

In block 704, the message encryption module 116 of the entity B 104 encrypts a message using the counterpart key.

In block 706, the message encryption module 116 sends the encrypted message to entity A.

FIG. 8 describes a procedure 800, performed by the entity A 102, for decrypting the message sent by the entity B 104.

In block 802, the decryption module 118 receives the ciphertext information, including the encrypted message M' from the entity B 104.

In block 804, the decryption module 118 decrypts the encrypted message M'. Block 804, in turn, can be conceptualized as a series of blocks (806, 808, 810) that are performed with respect to plural partial operations. Although FIG. 8 indicates that separate partial operations can be performed in series, in addition, or alternatively, two or more of these separate operations can be performed in parallel.

In block 806, a partial operation receives one or more inputs, on the basis of which it performs computations. For example, a partial operation may receive one or more components of the modified secret key collection from the store 112, one or more components of the received ciphertext information, etc.

In block 808, a partial operation computes a partial operation result based on the input(s).

In block 810, a partial operation provides a partial operation result, which the decryption module 118 can provide to the store 112.

Block 812 indicates that the decryption module 118 may repeat the above series of steps one or more times. In a final operation, the decryption message derives the key that it uses to decrypt the message and decrypts the message with this key.

The examples presented above set forth a scenario in which the leakage-resilient functionality helps prevent the disclosure of information regarding a secret key. The same principles can be used to protect any secure information, e.g., by representing the secure information using plural separate components and later using those plural components to reconstruct the secure information in a manner which is resilient to leakage-type attacks.

C. Representative Processing Functionality

FIG. 9 sets forth illustrative electrical computing functionality 900 that can be used to implement any aspect of the functions described above. With reference to FIG. 1, for instance, the type of computing functionality 900 shown in FIG. 9 can be used to implement any aspect of the system 100, such as the key-generating module 110, the message encryption module 116, the decryption module 118, etc. In one case, the computing functionality 900 may correspond to any type of computing device that includes one or more processing devices.

The computing functionality 900 can include volatile and non-volatile memory, such as RAM 902 and ROM 904, as well as one or more processing devices 906. The computing functionality 900 also optionally includes various media devices 908, such as a hard disk module, an optical disk module, and so forth. The computing functionality 900 can perform various operations identified above when the processing device(s) 906 executes instructions that are maintained by memory (e.g., RAM 902, ROM 904, or elsewhere). More generally, instructions and other information can be stored on any computer readable medium 910, including, but not limited to, static memory storage devices, magnetic storage devices, optical storage devices, and so on. The term computer readable medium also encompasses plural storage devices. The term computer readable medium also encompasses signals transmitted from a first location to a second location, e.g., via wire, cable, wireless transmission, etc.

The computing functionality 900 also includes an input/output module 912 for receiving various inputs from a user (via input modules 914), and for providing various outputs to the user (via output modules). One particular output mechanism may include a presentation module 916 and an associated graphical user interface (GUI) 918. The computing functionality 900 can also include one or more network interfaces 920 for exchanging data with other devices via one or more communication conduits 922. One or more communication buses 924 communicatively couple the above-described components together.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method, implemented by computing functionality, for reducing leakage of meaningful information from cryptographic operations, comprising:

generating an original secret key SK;

providing a counterpart key of the original secret key SK;

making the counterpart key available to a message-sending entity;

modifying the original secret key SK using a pairwise independent hash function to produce a modified secret key SK', the modified secret key SK' having individual components, the pairwise independent hash function being given by $H_K(r)=ar+b$ or $H_K(r)=A'^*B$, where a, b, A, B, and r are selected values and $H_K$ refers to a hash function that is keyed by a key K;

storing a modified secret key collection, which includes the modified secret key SK' and one or more of selected values a, b, A, B, and r;

receiving ciphertext information that includes an encrypted message from the message-sending entity, the encrypted message being created based on the counterpart key; and decrypting the encrypted message by performing plural partial operations using members of the modified secret key collection to generate plural respective partial operation results, the encrypted message being decrypted based on a combination of the plural partial decryption results, leakage of meaningful information being reduced due to difficulty in assembling meaningful information from separate leakage information leaked from the respective plural partial operations.

2. The method of claim 1, wherein the modified secret key SK' is given by $SK'=SK+H_K(r)$.

3. The method of claim 1, wherein the modified secret key SK' is given by $SK'=SK*H_K(r)$.

4. The method of claim 1, further comprising updating the modified secret key collection to produce a new modified secret key collection.

5. The method of claim 1, wherein said performing plural partial operations comprises, for each partial operation:
retrieving one or more inputs;
computing a partial operation result based on said one or more inputs; and
outputting the partial operation result.

6. The method of claim 5, wherein at least one of the plural partial operations receives an input from a partial operation result provided by at least one other partial operation.

7. The method of claim 5, wherein at least one of the plural operations receives at least one of: (a) a member of the modified secret key collection; (b) a part of the ciphertext information.

8. The method of claim 1, wherein at least a subset of said partial operations together perform an exponentiation operation in plural steps.

9. A computer readable storage memory for storing computer readable instructions, the computer readable instructions providing a key-generating module when executed by one or more processing devices, the computer readable instructions comprising:
logic configured to modify an original secret key SK using a pairwise independent hash function to produce a modified secret key SK', the modified secret key SK' having plural individual components, the pairwise independent hash function being given by $H_K(r)=ar+b$ or $H_K(r)=A^r*B$, where a, b, A, B, and r are selected values and $H_K$ refers to a hash function that is keyed by a key K;
logic configured to store a modified secret key collection having members selected from among the modified secret key SK' and the individual components of the modified secret key SK' including one or more of selected values a, b, A, B, and r, the modified secret key collection being updated periodically;
logic configured to receive ciphertext information that includes an encrypted message from a message-sending entity, the encrypted message being created based on a counterpart key; and
logic configured to decrypt the encrypted message by performing plural partial operations using members of the modified secret key collection to generate plural respective partial operation results, the encrypted message being decrypted based on a combination of the plural partial decryption results,
leakage of meaningful information being reduced by decrypting an encrypted message in plural partial operations using the modified secret key collection.

10. The computer readable storage memory of claim 9, wherein the modified secret key SK' is given by $SK'=SK+H_K(r)$.

11. The computer readable storage memory of claim 9, wherein the modified secret key SK' is given by $SK'=SK*H_K(r)$.

12. A computer-implemented decryption system, implemented by computing functionality, for decrypting an encrypted message provided within received ciphertext information, comprising: one or more memories operatively coupled to one or more processors providing:
logic configured to retrieve one or more inputs including ciphertext information that includes the encrypted message from a message-sending entity; and
logic configured to generate plural partial operation results based on modified secure information, the modified secure information being generated using a pairwise independent hash function, the modified secure information having plural members being updated periodically, the pairwise independent hash function being given by $H_K(r)=ar+b$ or $H_K(r)=A^r*B$, where a, b, A, B, and r are selected values and $H_K$ refers to a hash function that is keyed by a key K,
the encrypted message being decrypted based on a combination of the plural partial results based on the modified secure information and one or more of selected values a, b, A, B, and r,
leakage of meaningful information being reduced due to difficulty in assembling meaningful information from separate leakage information leaked from the respective plural partial operation results.

13. The decryption system of claim 12, wherein each of said plural partial operation modules comprises:
logic configured to compute a partial operation result based on said one or
more inputs; and
logic configured to output the partial operation result.

14. The decryption system of claim 13, where said logic configured to retrieve one or more inputs comprises logic configured to retrieve at least one of: (a) one or more members of the modified secure information; or (b) a part of the ciphertext information.

15. The decryption system of claim 12, wherein at least a subset of said partial operations together perform an exponentiation operation in plural steps.

16. The method of claim 1, further comprising removing the original secret key.

17. The method of claim 1, wherein two or more partial operations of the plural partial operations are performed in parallel.

18. The method of claim 1, wherein the key K is selected randomly.

19. The computer readable storage memory of claim 9, wherein two or more partial operations of the plural partial operations are performed in parallel.

20. The computer readable storage memory of claim 9, wherein the key K is selected randomly.

* * * * *